United States Patent
Choi et al.

(10) Patent No.: US 9,614,248 B2
(45) Date of Patent: Apr. 4, 2017

(54) STACK-FOLDING TYPE ELECTRODE ASSEMBLY AND METHOD OF MANUFACTURING THE SAME

(71) Applicant: LG Chem, Ltd., Seoul (KR)

(72) Inventors: Jung-Seok Choi, Daejeon (KR); Jae-Hyun Lee, Daejeon (KR); Ji-Hyun Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/911,207

(22) PCT Filed: May 13, 2015

(86) PCT No.: PCT/KR2015/004806
§ 371 (c)(1),
(2) Date: Feb. 9, 2016

(87) PCT Pub. No.: WO2016/024699
PCT Pub. Date: Feb. 18, 2016

(65) Prior Publication Data
US 2016/0293994 A1    Oct. 6, 2016

(30) Foreign Application Priority Data

Aug. 13, 2014  (KR) .................. 10-2014-0105263
Aug. 13, 2014  (KR) .................. 10-2014-0105264

(51) Int. Cl.
*H01M 10/04*  (2006.01)
*H01M 10/052*  (2010.01)
*H01M 10/0585*  (2010.01)

(52) U.S. Cl.
CPC ..... *H01M 10/0459* (2013.01); *H01M 10/049* (2013.01); *H01M 10/0413* (2013.01);
(Continued)

(58) Field of Classification Search
CPC . H01M 10/04; H01M 10/0459; H01M 10/058
See application file for complete search history.

(56) References Cited

U.S. PATENT DOCUMENTS

2002/0160257 A1*  10/2002  Lee .................. H01M 6/46
                                                   429/130
2011/0217586 A1   9/2011  Kim et al.

FOREIGN PATENT DOCUMENTS

KR    2001-0082059 A    8/2001
KR    100610261 B1     8/2006
(Continued)

OTHER PUBLICATIONS

International Search Report for Application No. PCT/KR2015/004806 dated Jul. 17, 2015.
(Continued)

*Primary Examiner* — Mark F Huff
*Assistant Examiner* — Monique Wills
(74) *Attorney, Agent, or Firm* — Lerner, David, Littenburg, Krumholz & Mentlik, LLP

(57) ABSTRACT

The stack-folding type electrode assembly according to the present disclosure is an electrode assembly including a plurality of stack type unit cells which is stacked on one another with a continuous folding separator sheet interposed between each of the stacked unit cells, wherein the unit cells has a combination of at least two quad cells of a positive electrode/separator/negative electrode/separator/positive electrode/separator/negative electrode structure, and one C-type bicell of a negative electrode/separator/positive electrode/separator/negative electrode structure, and unit cells disposed above and below a central part or a winding start point have an asymmetrical structure each other with the quad cell disposed at the central part, or unit cells disposed above and below a central part or a winding start point have
(Continued)

a symmetrical structure each other with the C-type bicell disposed at the central part.

16 Claims, 19 Drawing Sheets

(52) U.S. Cl.
CPC ...... *H01M 10/052* (2013.01); *H01M 10/0585* (2013.01); *H01M 2220/20* (2013.01)

(56) References Cited

FOREIGN PATENT DOCUMENTS

| KR | 2006-0122344 A | 11/2006 |
|----|----------------|---------|
| KR | 20070020597 A  | 2/2007  |
| KR | 2008-0005629 A | 1/2008  |
| KR | 20080015159 A  | 2/2008  |
| KR | 2009-0008075 A | 1/2009  |
| KR | 2014-0035646 A | 3/2014  |

OTHER PUBLICATIONS

International Written Opinion for Application No. PCT/KR2015/004806 dated Jul. 17, 2015.

\* cited by examiner

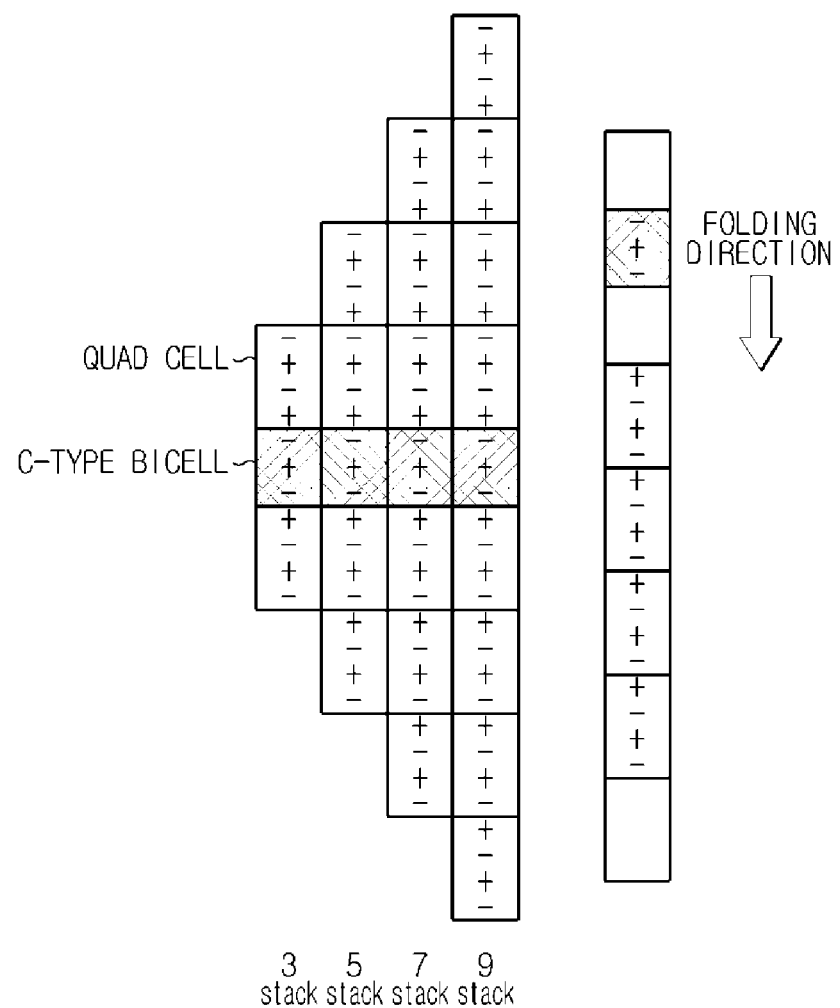

STACK-FOLDING TYPE ELECTRODE ASSEMBLY AND METHOD OF MANUFACTURING THE SAME

CROSS-REFERENCE TO RELATED APPLICATION

This application is a national phase entry under 35 U.S.C. §371 of International Application No. PCT/KR2015/004806, filed May 13, 2015, which claims priority to Korean Patent Application No. 10-2014-0105263, filed Aug. 13, 2014 and Korean Patent Application No. 10-2014-0105264, filed Aug. 13, 2014, the disclosures of which are incorporated herein by reference.

TECHNICAL FIELD

The present disclosure relates to a stack-folding type electrode assembly and a method of manufacturing the same, and more particularly, to a stack-folding type electrode assembly with the reduced number of folding and a method of manufacturing the same.

BACKGROUND ART

With the technology development and the increasing demands for mobile devices, the demand for secondary batteries are also dramatically increasing, and particularly, lithium secondary batteries having a high energy density and a high operating voltage and good storage and life characteristics are being widely used as an energy source of various types of mobile devices as well as a variety of electronic products.

Secondary batteries are greatly classified into cylindrical batteries, prismatic batteries, and pouch type batteries according to external and internal structural features, and among them, prismatic batteries and pouch type batteries are particularly gaining attention due to being stackable at a high degree of integration and having a small width relative to a length.

An electrode assembly of a positive electrode/separator/negative electrode structure constituting a secondary battery is largely sorted into a jelly-roll type (winding type) and a stack type according to its structure. The jelly-roll type electrode assembly is made by coating an electrode active material on a metal foil used as a current collector, drying and pressing, tailoring in the shape of a band of desired width and length, interposing a separator between a negative electrode and a positive electrode, and rolling in a spiral pattern. The jelly-roll type electrode assembly is suitable for cylindrical batteries, but in the applications to prismatic or pouch type batteries, there are drawbacks such as a release problem of an electrode active material and low spatial utilization. On the other hand, the stack type electrode assembly has a structure in which a plurality of positive and negative electrode unit cells is stacked in a sequential order, and possesses an advantage of being easy to obtain a prismatic shape, but has disadvantages of a complex manufacturing process and a risk of a short circuit caused by misalignment of an electrode when impacts are applied.

To solve the problem, attempts have been made to develop an electrode assembly of a combined type of a jelly-roll type and a stack type, called a stack-folding type electrode assembly, having a structure in which a full cell of a positive electrode/separator/negative electrode structure or a bicell of a positive electrode (negative electrode)/separator/negative electrode (positive electrode)/separator/positive electrode (negative electrode) structure is folded using a long continuous folding separator sheet.

FIGS. 1 and 2 are diagrams illustrating an exemplary structure and a manufacturing process of the stack-folding type electrode assembly.

Referring to the drawings, as unit cells, C-type bicells 10, 13, and 14 of a negative electrode/separator/positive electrode/separator/negative electrode structure and A-type bicells 11 and 12 of a positive electrode/separator/negative electrode/separator/positive electrode structure are alternately stacked in a sequential order, and a folding separator sheet 20 is interposed between each stacked bicell. The folding separator sheet 20 has a unit length sufficient to surround the bicells, and is interposed between each stacked bicell in a structure that is folded inwards each unit length to continuously surround each bicell starting from the central bicell 10 to the outermost bicell 14. The folding separator sheet 20 is finished by heat welding or attaching, for example, an adhesive tape 25 at an end thereof.

The stack-folding type electrode assembly is made by, for example, arranging the bicells 10, 11, 12, 13, and 14 on the long folding separator sheet 20 and winding in a sequential order starting from one end 21 of the folding separator sheet 20.

In this instance, seeing an arrangement combination of the unit cells, the bicells 10, 11, 12, 13, and 14, the first bicell 10 and the second bicell 11 are spaced apart at a width interval corresponding to at least one bicell, and in the winding process, an outer surface of the first bicell 10 is completely covered with the folding separator sheet 20 and a bottom electrode (negative electrode, −) of the first bicell 10 comes into contact with a top electrode (positive electrode, +) of the second bicell 11. As a coating length of the folding separator sheet 20 increases during the sequential stack process by winding, the bicells 12, 13, and 14 subsequent to the second bicell 11 are arranged at a sequentially increasing interval therebetween in the winding direction. Also, because the bicells 10, 11, 12, 13, and 14 should be stacked such that a positive electrode and a negative electrode face each other at an interface during winding, the first bicell 10 is a bicell having a top electrode as a negative electrode, the second bicell 11 and the third bicell 12 is a bicell having a top electrode as a positive electrode, and the fourth bicell 13 and the fifth bicell 14 is a bicell having a top electrode as a negative electrode. That is, the bicells are mounted in an alternating arrangement by two units.

The stack-folding type electrode assembly makes up for the drawbacks of a jelly-roll type electrode assembly and a stack type electrode assembly, but when the number of bicell stacks increases for a high energy density, the number of folding increases, causing electrode assembly cell dimensional change/defect ratio increase and process time increase problems. As shown in FIG. 2, the type of an electrode placed on the folding separator sheet periodically changes, so a time loss occurs due to the cell type exchange (A-type bicell, C-type bicell) and the battery fabrication efficiency reduces.

Table 1 shows the number of electrodes with the increasing number of stacks in a stack-folding type electrode assembly such as one as shown in FIG. 1.

TABLE 1

| Number of stacks | 1 | 3 | 5 | 7 | 9 | 11 | 13 | . . . |
|---|---|---|---|---|---|---|---|---|
| Number of electrodes | 3 | 9 | 15 | 21 | 27 | 33 | 39 | . . . |

Conventionally, a cell design involves increasing the number of electrodes by 6 with the increasing number of stacks as described above, so there is a limitation in changing the number of stacks for cell performance such as thickness, capacity, or resistance, resulting in low degree of freedom of design. Therefore, a stack-folding type electrode assembly with a reduced number of folding, high battery fabrication efficiency and a high degree of freedom of design and a method of manufacturing the same is required.

DISCLOSURE

Technical Problem

The present disclosure is to providing a stack-folding type electrode assembly with the reduced number of folding, high battery fabrication efficiency, and a high degree of freedom of design and a method of manufacturing the same.

Technical Solution

To achieve the above object, there is provided a stack-folding type electrode assembly according to the present disclosure including a plurality of stack type unit cells which is stacked on one another with a continuous folding separator sheet interposed between each of the stacked unit cells, wherein the unit cells have a combination of at least two quad cells of a positive electrode/separator/negative electrode/separator/positive electrode/separator/negative electrode structure, and one C-type bicell of a negative electrode/separator/positive electrode/separator/negative electrode structure.

According to one embodiment, there is an electrode assembly in which unit cells disposed above and below a central part or a winding start point have an asymmetrical structure each other with the quad cell disposed at the central part. The quad cells respectively disposed above and below the central C-type bicell may have an electrode direction which is symmetrical to each other.

Preferably, the negative electrode may be disposed at an outermost of the electrode assembly.

The folding separator sheet may have a unit length sufficient to surround the unit cells, and may be folded inwards each unit length to continuously surround the unit cells starting from a central unit cell to an outermost unit cell.

The folding separator sheet may be an asymmetrical separator having different properties on both surfaces.

In a preferred embodiment, the folding separator sheet may include a separator fabric, a coating layer formed on one surface of the separator fabric, the coating layer containing an inorganic material for a negative electrode and a binder, and a coating layer formed on the other surface of the separator fabric, the coating layer containing an inorganic material for a positive electrode and a binder, and the negative electrodes of the C-type bicell and the quad cells may be disposed on the coating layer containing an inorganic material for a negative electrode and a binder, and the positive electrodes of the C-type bicell and the quad cells may be disposed on the coating layer containing an inorganic material for a positive electrode and a binder.

In another preferred embodiment, the folding separator sheet may have a stack structure of a first separator and a second separator, and the negative electrodes of the C-type bicell and the quad cells may be disposed on any one of the first separator and the second separator, and the positive electrodes of the C-type bicell and the quad cells may be disposed on the other.

The present disclosure further provides a secondary battery including the stack-folding type electrode.

A method of manufacturing the stack-folding type electrode assembly is as follows. First, a central unit cell is disposed at a first end of a folding separator sheet, unit cells are continuously disposed at a predetermined interval, the central unit cell is wound with the folding separator sheet once, and the folding separator sheet is folded toward an outside where the adjacent unit cell is disposed to stack the unit cells.

The present disclosure further proposes a method of manufacturing the stack-folding type electrode assembly including a cell design step of increasing a number of quad cells by one to increase a number of electrodes by four, on the basis of an electrode assembly including two quad cells and one C-type bicell.

In the asymmetrical electrode assembly, the C-type bicell may be inserted at an outermost of the electrode assembly, immediately above or below the center where the winding starts, or in the middle of the stack.

Advantageous Effects

According to the present disclosure, the use of a quad cell having a larger number of electrodes than a bicell may contribute to a lower number of unit assemblies than an ordinary one having the same number of electrodes, and as a consequence, the reduced number of folding. Accordingly, a folding dimensional allowance and a defect ratio may be reduced, and the lamination and folding process time may be reduced.

Further, the degree of freedom of the number of electrode stacks may increase through asymmetrical folding of bicell-quad cell combinations. Accordingly, cell design may be freely changed.

In addition, as opposed to a traditional manufacturing method whereby two types of bicells an A-type bicell and a C-type bicell are prepared and each bicell is wound in an alternating manner, a time loss caused by the cell type exchange (A-type bicell, C-type bicell) may be reduced and the battery fabrication efficiency may be maximized. Without arranging electrodes of unit cells by an alternating arrangement method, fabrication may be accomplished by arranging negative electrodes of all unit cells including one C-type bicell and at least two quad cells on a folding separator sheet and winding them, thereby simplifying a manufacturing process and significantly improving the production efficiency.

Particularly, the battery performance may be improved by allowing positive•negative electrodes of unit cells to selectively come into contact with a particular surface of an asymmetrical separator.

BRIEF DESCRIPTION OF THE DRAWINGS

FIG. 19 illustrates possible examples where the number of stacks is three or more in a symmetrical electrode assembly according to the present disclosure; (a) through (d) schematically illustrate a stack structure within a cell, in particular, together with a folding method of (b).

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

It should be further understood that batteries or electrode assemblies covered by the present disclosure include, without limitation to a particular type, all various types, for example, a stack-folding type electrode assembly having a plurality of stack type unit cells wound with a folding separator sheet tailored in a long shape and a Z-type stack electrode assembly having stack type unit cells wound with a folding separator sheet by zigzag-direction folding.

Figure 3:
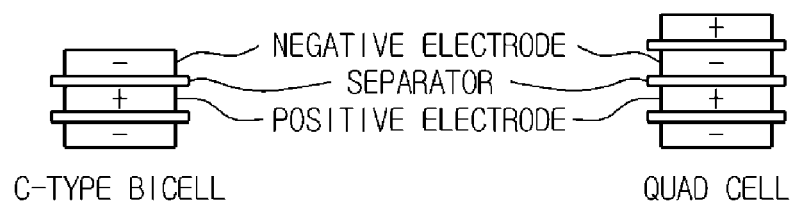
FIG. 3 illustrates a C-type bicell and a quad cell comprising unit cells of a stack-folding type electrode assembly according to the present disclosure.

FIG. 3 illustrates a C-type bicell and a quad cell comprising unit cells of a stack-folding type electrode assembly according to the present disclosure.

The C-type bicell has a negative electrode/separator/positive electrode/separator/negative electrode structure, and the quad cell has a positive electrode/separator/negative electrode/separator/positive electrode/separator/negative electrode structure. The unit cell positive electrode is prepared, for example, by coating a mixture of a positive electrode active material, a conductive material, and a binder on both surfaces of a positive electrode current collector and drying and pressing it, and a filler may be added to the mixture according to the necessity. The unit cell negative electrode is prepared by coating a negative electrode active material on a negative electrode current collector, and drying and pressing it, and similar to the former, a conductive material, a binder, and a filler may be optionally further included according to the necessity. Although the positive electrode active material or negative electrode active material is coated on both surfaces of the current collector (electrode sheet) for each of the positive electrode and the negative electrode as described above, its illustration is omitted herein for convenience.

Figure 4:
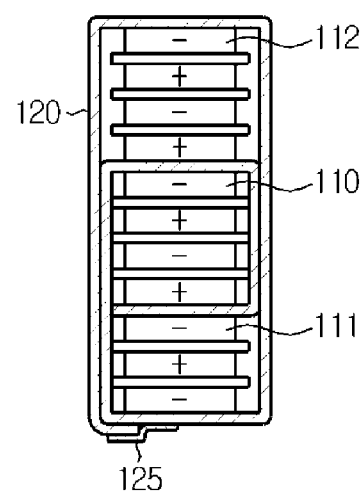
FIG. 4 is a diagram illustrating a stack-folding type asymmetrical electrode assembly structure according to one embodiment of the present disclosure.

FIG. 4 is a diagram illustrating a stack-folding type asymmetrical electrode assembly structure according to one embodiment of the present disclosure.

Referring to FIG. 4, the stack-folding type asymmetrical electrode assembly has a plurality of stack type unit cells 110, 111 and 112 stacked on one another with a folding separator sheet 120 interposed between each stacked unit cell. The folding separator sheet 120 has a unit length sufficient to surround the unit cells 110, 111 and 112, and is interposed between the stacked unit cells 110, 111 and 112 in a structure that is folded inwards each unit length to continuously surround each of the unit cells 110, 111 and 112 starting from the central unit cell 110 to the outermost unit cell 112. Also, the folding separator sheet 120 is finished by heat welding or attaching an adhesive tape 125 at an end thereof.

The electrode assembly includes the quad cells 110 and 112 of a positive electrode/separator/negative electrode/separator/positive electrode/separator/negative electrode structure, and the C-type bicell 111 of a negative electrode/separator/positive electrode/separator/negative electrode structure.

Among the stacked unit cells 110, 111 and 112, the quad cell 110 ('central unit cell') is disposed at the center or a winding start point. Also, the unit cells 111 and 112 respectively disposed on and below the central unit cell have an asymmetrical structure each other. The negative electrode may be disposed at the outermost of the electrode assembly. Particularly, this embodiment shows a folding structure that allows the C-type bicell 111 to be placed immediately below the central unit cell.

When a plurality of unit cells is stacked such that a positive electrode and a negative electrode face each other, a negative electrode is designed to occupy a larger area, for example, in the case of lithium secondary batteries, to impede the lithium metal dendrite growth on a negative electrode during charging/discharging. Accordingly, the negative electrode may be formed with a larger area than the positive electrode and/or the negative electrode may be disposed at the outermost of the electrode assembly.

Figure 5:
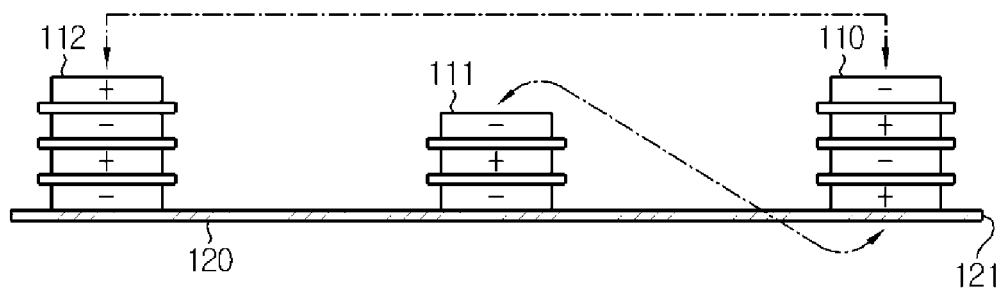
FIG. 5 is a diagram illustrating an arrangement combination of unit cells in a process of manufacturing the stack-folding type asymmetrical electrode assembly of FIG. 4.

FIG. 5 is a diagram illustrating an arrangement combination of unit cells in a process of manufacturing the stack-folding type asymmetrical electrode assembly of FIG. 4.

According to a method of manufacturing a stack-folding type asymmetrical electrode assembly, first, a positive electrode and a negative electrode are stacked with a separator interposed between, and cut in a predetermined size into a plurality of quad cells and a bicell to prepare unit cells 110, 111 and 112. After preparing a folding separator sheet 120 tailored in a long shape, the unit cells 110, 111 and 112 are arranged as shown in FIG. 5. The folding separator sheet 120 has a slightly larger width of the unit cells 110, 111 and 112 such that electrode tabs (not shown) of the unit cells 110, 111 and 112 are exposed, and an extended length sufficient to surround the electrode assembly once after winding, and an outermost end of the folding separator sheet 120 may be fixed by heat welding or attaching a tape. For example, by allowing a heat welder or a hot plate to come into contact with the folding separator sheet 120 to be finished, the folding separator sheet 120 per se may be welded by heat and adhered and fixed, and the folding separator sheet 120 may be also finished by, for example, an adhesive tape 125.

The stack-folding type asymmetrical electrode assembly is manufactured by arranging the unit cells 110, 111 and 112 on the long folding separator sheet 120 and winding in a sequential order starting from one end 121 of the folding separator sheet 120. In this instance, after winding the central unit cell 110 with the folding separator sheet 120 once, the folding separator sheet 120 is folded toward the outside where the adjacent unit cells 111 and 112 are disposed, to stack each unit cell 111 and 112.

Seeing an arrangement combination of the unit cells 110, 111 and 112, the central unit cell 110 or the quad cell is disposed at one end 121 of the folding separator sheet 120, and the unit cells 111 and 112 are consecutively arranged at a predetermined interval. The first unit cell, i.e., the central unit cell 110 and second unit cell 111 are spaced apart at a width interval corresponding to at least one unit cell, so during the winding process, an exterior of the central unit cell 110 is completely covered with the folding separator sheet 120, and then a bottom electrode (positive electrode) of the central unit cell 110 comes into contact with a top electrode (negative electrode) of the second unit cell 111.

The number of unit cells wound on the folding separator sheet 120 may be determined by various factors such as structure of the unit cells including each quad cell and the bicell and a desired capacity of a battery to be finally fabricated. For the convenience of illustration, although FIG. 4 shows three unit cells, the number of unit cells included in the stack-folding type electrode assembly may be fewer or more, and in particular, an electrode assembly for use in hybrid electric vehicles (HEVs) has at least 10 stacks.

The folding separator sheet 120 may be made from the same material as the separator constituting the unit cell. The folding separator sheet or separator may be made from at least one material selected from the group consisting of a microporous polyethylene film, a microporous polypropylene film, or a multilayer film prepared from a combination of these films, and a polymer film for a polymer electrolyte of polyvinylidene fluoride, polyethylene oxide, polyacrylonitrile, or polyvinylidene fluoride-co-hexafluoropropylene, and may be a folding separator sheet or separator made of a single layer or a multilayer of two or more layers prepared using the material.

The subsequent battery fabrication process is as follows. Positive and negative electrode leads are welded to an electrode tab part of the prepared stack-folding type electrode assembly. In this instance, it is effective to use aluminum for the positive electrode and copper for the negative electrode. After a packing operation of packing the welded cell in an aluminum pouch, an electrolyte solution is fed.

The electrolyte solution is not limited to a particular type, and includes those being used in the art. Particularly, at least one selected from dimethyl carbonate (DMC), ethylene carbonate (EC), ethyl methyl carbonate (EMC), propylene carbonate (PC), ethylene carbonate (EC), dimethyl carbonate (DMC), dimethyl acetamide (DMA), N,N-dimethylformamide (DMF), N-methyl-2-pyrrolidinone (NMP), dimethyl sulfoxide (DMSO), tetrahydrofuran (THF), and diethylene carbonate (DEC) is available.

In the structure shown in FIG. 4, for instance, with regard to the quad cell 110 at the center, the quad cell 112 is disposed above and the C-type bicell 111 is disposed below. Possibly, only one C-type bicell included in the electrode assembly may be disposed above or below the central unit cell.

Figure 6:
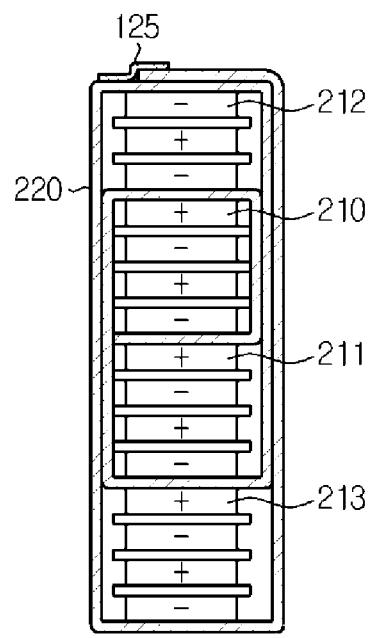
FIG. 6 is a diagram illustrating a stack-folding type asymmetrical electrode assembly structure according to another embodiment of the present disclosure.

For example, FIG. 6 illustrates an electrode assembly of such a case. FIG. 6 is a diagram illustrating a stack-folding type asymmetrical electrode assembly structure according to another embodiment of the present disclosure, and FIG. 7 is a diagram illustrating an arrangement combination of unit cells in a process of manufacturing the stack-folding type asymmetrical electrode assembly of FIG. 6.

The stack-folding type asymmetrical electrode assembly according to FIG. 6 has unit cells 210, 211, 212, and 213 stacked on one another with a folding separator sheet 220 interposed between each stacked unit cell. The folding separator sheet 220 has a unit length sufficient to surround the unit cells unit cells 210, 211, 212, and 213, and is interposed between the stacked unit cells 210, 211, 212, and 213 in a structure that is folded inwards each unit length to continuously surround each of the unit cells 210, 211, 212, and 213 starting from the central unit cell 210 to the outermost unit cell 213. Also, the folding separator sheet 220 is finished by heat welding or attaching, for example, an adhesive tape 225 at an end thereof. The electrode assembly includes the C-type bicell 212 and the quad cells 210, 211, and 213.

The stack-folding type asymmetrical electrode assembly is manufactured by arranging the unit cells 210, 211, 212, and 213 on the long folding separator sheet 220 and winding in a sequential order from one end of the folding separator sheet 220. The central unit cell 210 or the quad cell is disposed at one end 221 of the folding separator sheet 220, and the unit cells 211, 212, and 213 are consecutively arranged at a predetermined interval. Because the unit cells 210, 211, 212, and 213 should be stacked such that a positive electrode and a negative electrode face each other at an interface during winding, the central unit cell 210 is a quad cell having a top electrode as a positive electrode, the second unit cell 211 is a quad cell having a top electrode as a positive electrode, the third unit cell 212 is a C-type bicell having a top electrode as a negative electrode, and the fourth unit cell 213 is a quad cell having a top electrode as a positive electrode.

Figure 7:
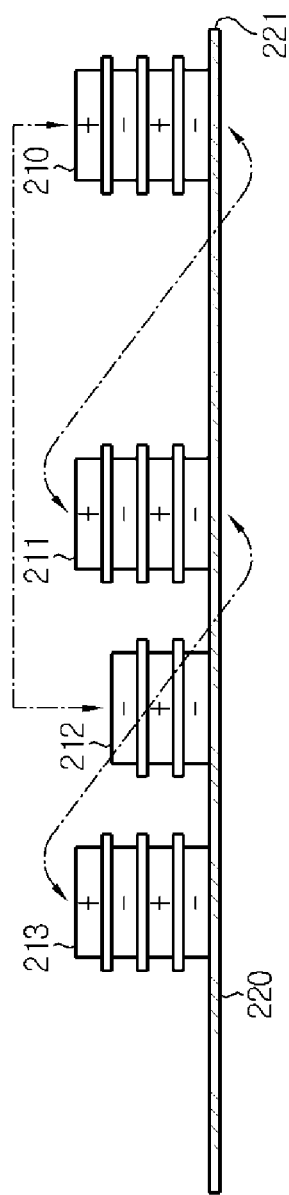
FIG. 7 is a diagram illustrating an arrangement combination of unit cells in a process of manufacturing the stack-folding type asymmetrical electrode assembly of FIG. 6.

As shown in FIG. 7, in this embodiment, the negative electrodes of all the unit cells 210, 211, 212, and 213 are disposed on the folding separator sheet 220. As opposed to a related art, without arranging electrodes of unit cells by an alternating arrangement method, fabrication may be accomplished by arranging negative electrodes for all unit cells including one C-type bicell and at least two quad cells on a folding separator sheet and winding them, thereby simplifying a manufacturing process and significantly improving the production efficiency.

As shown in FIG. 7, when the negative electrodes of all the unit cells 210, 211, 212, and 213 are disposed on the folding separator sheet 220, an asymmetrical separator having different properties on both surfaces may be used instead of the folding separator sheet 220. According to the related art described by referring to FIGS. 1 and 2, because an electrode placed on a folding separator sheet changes in polarity in an alternating manner, this asymmetrical separator structure cannot be applied. FIGS. 8 through 11 illustrate examples in which an asymmetrical separator is applied according to the present disclosure.

Figure 8:
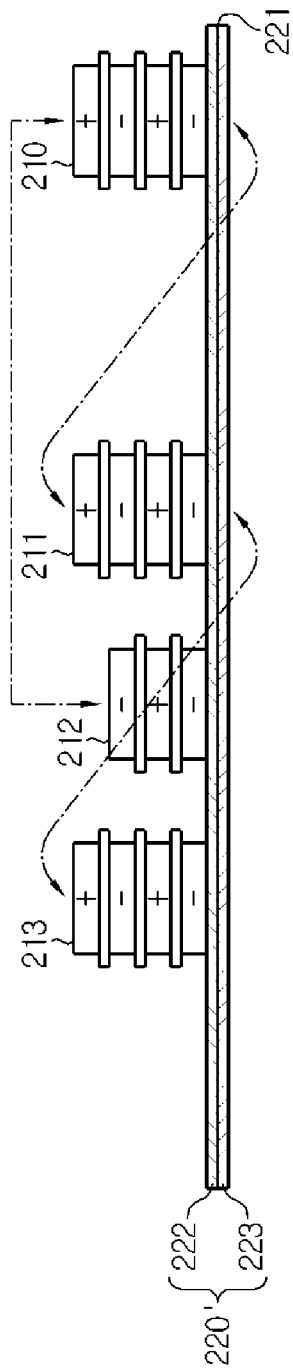
FIG. 8 is a diagram illustrating an arrangement combination of unit cells for describing a process of manufacturing a stack-folding type asymmetrical electrode assembly according to another embodiment of the present disclosure.
Figure 9:
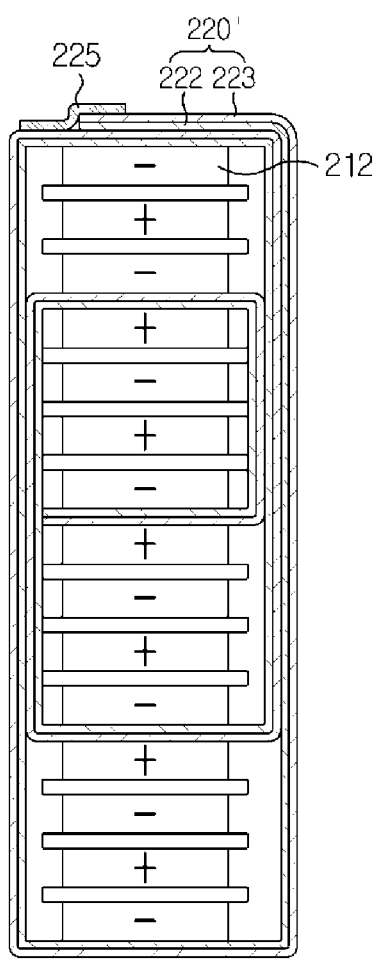
FIG. 9 is a diagram illustrating a stack-folding type asymmetrical electrode assembly structure thereby.

First, FIG. 8 is a diagram illustrating an arrangement combination of unit cells for describing a process of manufacturing a stack-folding type electrode assembly according to another embodiment of the present disclosure, and FIG. 9 is a diagram illustrating a stack-folding type electrode assembly structure thereby.

A folding separator sheet 220' is an asymmetrical separator having different properties on both surfaces. Specifically, the folding separator sheet 220' has a stack structure of a first separator 222 and a second separator 223, and the negative electrodes of all the unit cells 210, 211, 212, and 213 are arranged on the first separator 222. For example, the first separator 222 and the second separator 223 may be membranes having different design structures such as a pore size, a distribution, and a thickness. This design may be changed to optimally suit the positive•negative electrode characteristics. For example, in this embodiment, the first separator 222 has a composition and/or thickness for selectively modifying a contact surface between the negative electrode and the separator and the second separator 223 has a composition and/or a thickness for selectively modifying a contact surface between the positive electrode and the separator.

After arrangement as shown in FIG. 8, when winding is carried out in a sequential order starting from one end 221 of the folding separator sheet 220, a stack-folding type electrode assembly such as one shown in FIG. 9 may be obtained.

In FIG. 8, a structure is shown in which the negative electrodes of the C-type bicell 212 and the quad cells 210, 211, and 213 are disposed on the first separator 222, and the positive electrodes of the C-type bicell 212 and the quad cells 210, 211, and 213 are disposed on the second separator 223. Therefore, according to the present disclosure, the battery performance may be improved by allowing positive•negative electrodes of unit cells to coming into contact with a particular surface of an asymmetrical separator.

Figure 10:
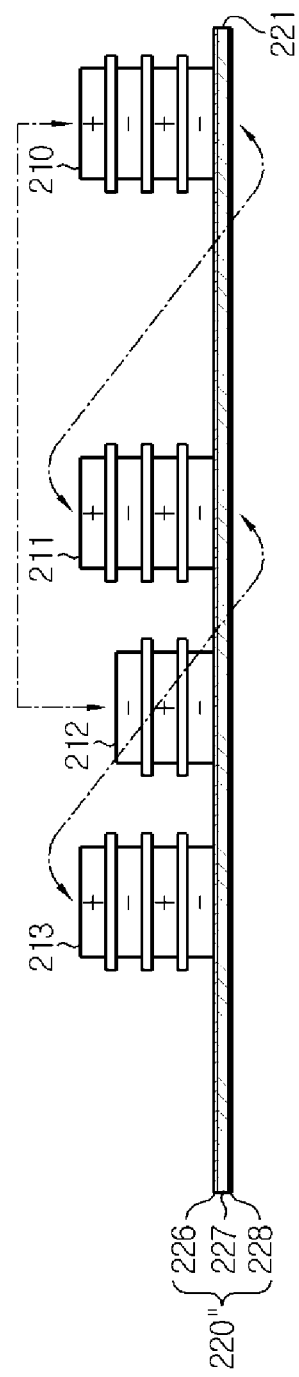
FIG. 10 is a diagram illustrating an arrangement combination of unit cells for describing a process of manufacturing a stack-folding type asymmetrical electrode assembly according to another embodiment of the present disclosure.
Figure 11:
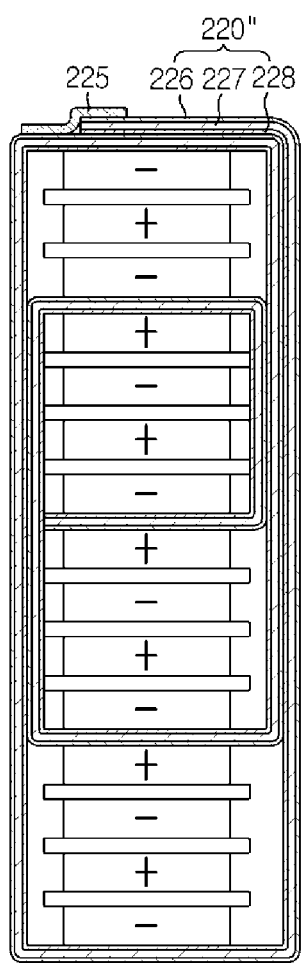
FIG. 11 is a diagram illustrating a stack-folding type asymmetrical electrode assembly structure thereby.

FIG. 10 is a diagram illustrating an arrangement combination of unit cells for describing a stack-folding type asymmetrical electrode assembly according to another embodiment of the present disclosure and a process of manufacturing the same, and FIG. 11 is a diagram illustrating a stack-folding type asymmetrical electrode assembly structure thereby.

The examples illustrated in FIGS. 10 and 11 alternatively have a folding separator sheet 220" when compared to the examples illustrated in FIGS. 8 and 9.

A folding separator sheet 220" includes a separator fabric 227, a coating layer 226 formed on one surface of the separator fabric 227, containing an inorganic material for a negative electrode and a binder, and a coating layer 228 formed on the other surface of the separator fabric 227, containing an inorganic material for a positive electrode and a binder. When winding is performed with the negative electrodes of the C-type bicell 212 and the quad cells 210, 211, and 213 placed on the coating layer 226 containing an inorganic material for a negative electrode and a binder as shown in FIG. 10, the negative electrodes of the C-type bicell 212 and the quad cells 210, 211, and 213 are disposed on the coating layer 226 containing an inorganic material for a negative electrode and a binder and the positive electrodes of the C-type bicell 212 and the quad cells 210, 211, and 213 are disposed on the coating layer 228 containing an inorganic material for a positive electrode and a binder as shown in FIG. 11.

The separator fabric 227 includes a fiber, preferably, a fiber selected from polyamide, polyacrylonitrile, polyester [for example: polyethylene terephthalate (PET)] and/or polyolefin [for example: polyethylene (PE) or polypropylene (PP)], a glass fiber or a ceramic fiber. Preferably, the separator fabric 227 may include a polymer fiber having a melting temperature higher than 100° C. and a melting point higher than 110° C. Also, the separator fabric 227 and/or the coating layers 226 and 228 may preferably include $Li_2CO_3$, $Li_3N$ or $LiAlO_3$. The ionic conductivity through the folding separator sheet 220" may be preferably increased thereby. The inorganic material forming the coating layers 226 and 228 may include $SiO_2$, $Al_2O_3$, $ZrO_2$ or SiC.

The folding separator sheet 220" is a separator coated with a binder and an inorganic material to improve the secondary battery cell performance, where the negative electrodes of the unit cells are always disposed on the coating layer 226 containing an inorganic material for a negative electrode and a binder, and the positive electrodes of the unit cells are always disposed on the coating layer 228 containing an inorganic material for a positive electrode and a binder, thereby maximizing the asymmetrical separator effects.

According to the present disclosure, fabrication may be accomplished by arranging the negative electrodes of all the unit cells on the coating layer 226 of the folding separator sheet 220" containing an inorganic material for a negative electrode and a binder and winding them, thereby simplifying a manufacturing process and significantly improving the production efficiency.

As described hereinabove, the stack-folding type electrode assembly according to the present disclosure includes, as unit cells, at least two quad cells of a positive electrode/separator/negative electrode/separator/positive electrode/separator/negative electrode structure, and one C-type bicell of a negative electrode/separator/positive electrode/separator/negative electrode structure. As the total number of unit assemblies reduces for the same number of electrodes, the number of lamination may reduce, and with the decreasing number of unit assemblies, the number of folding reduces and the degree of freedom of design increases.

As opposed to a traditional manufacturing method whereby two types of bicells an A-type bicell and a C-type bicell are prepared and each bicell is wound in an alternating manner, a time loss caused by the cell type exchange (A-type bicell, C-type bicell) may be reduced and the battery fabrication efficiency may be maximized. Without arranging electrodes of unit cells by an alternating arrangement method, fabrication may be accomplished by arranging negative electrodes for all unit cells including one C-type bicell and at least two quad cells on a folding separator sheet and winding them, thereby simplifying a manufacturing process and significantly improving the production efficiency. Particularly, the battery performance may be improved by allowing positive•negative electrodes of unit cells to selectively come into contact with a particular surface of an asymmetrical separator.

Hereinafter, in the case of an asymmetrical electrode assembly, an effect of the present disclosure for an increase in the degree of freedom of design and cell design steps are described in further detail.

Figure 12:
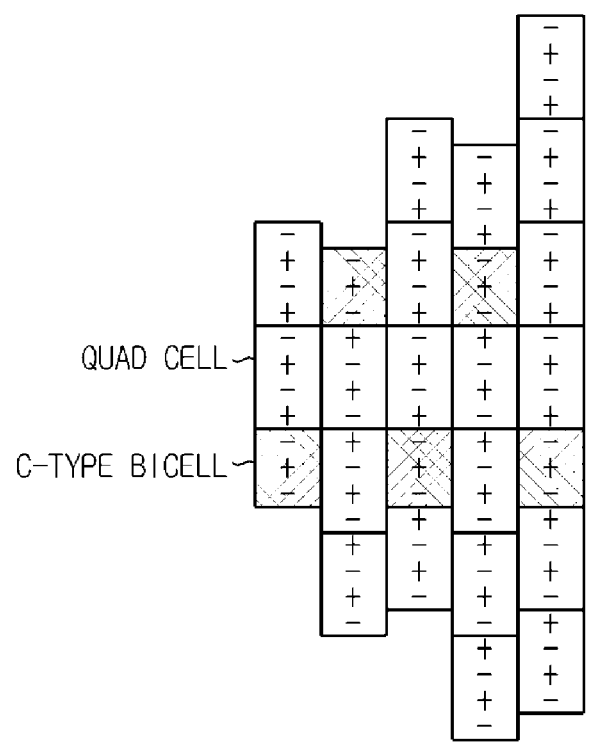
FIG. 12 illustrates possible examples where the number of stacks is three or more in an asymmetrical electrode assembly according to the present disclosure; (a) through (e) schematically illustrate a stack structure within a cell.

FIG. 12 illustrates possible examples where the number of stacks is three or more in an asymmetrical electrode assembly according to the present disclosure. From (a) to (e), the number of quad cells increases by one. It comes from a result of cell design with the increasing number of quad cells by one, as a result, with the increasing number of electrodes by four, on the basis of an electrode assembly including two quad cells and one C-type bicell as shown in (a). Although the drawing illustrates, as an example, a case in which the C-type bicell is disposed immediately above or below the center of the electrode assembly where winding starts, the C-type bicell may be inserted at the outmost or in the middle of stack of the electrode assembly. Table 2 shows the number of stacks and the number of electrodes in the electrode assembly of an asymmetrical structure according to the present disclosure.

TABLE 2

| | | | | | |
|---|---|---|---|---|---|
| Number of stacks (example) | 3 | 4 | 5 | 6 | 7 |
| Number of electrodes (example) | 11 | 15 | 19 | 23 | 27 |
| Number of stacks converted to traditional electrode assembly | 3.67(*) | 5.00 | 6.33(*) | 7.67(*) | 9.00 |

It can be designed to increase the number of electrodes by four, amounting to 11, 15, 19, 23, and 27 in a sequential order. As compared to the related art shown in FIGS. 1 and 2 involving increasing the number of electrodes by six, it is found that the number of electrodes may be finely adjusted.

Figure 13:
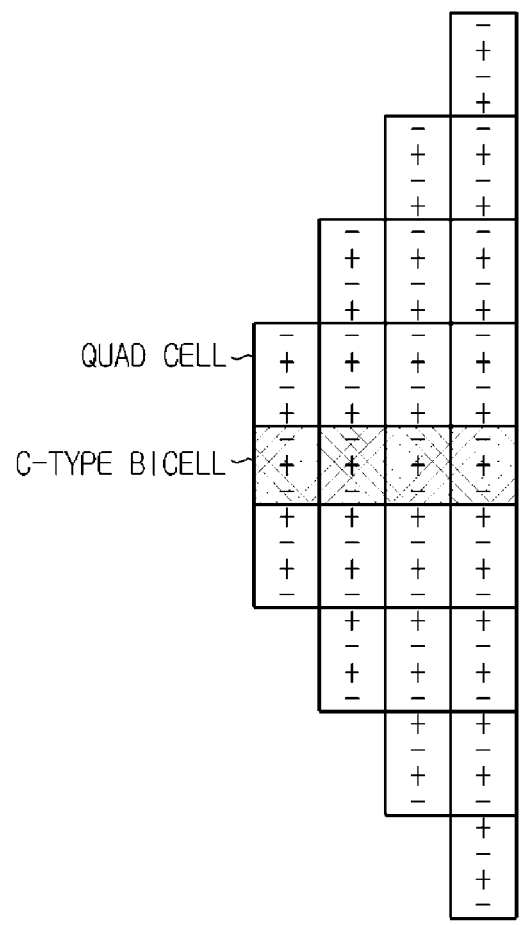
FIG. 13 illustrates examples of an electrode assembly of a symmetrical structure, as a comparative example, the electrode assembly including quad cells and a C-type bicell with the C-type bicell disposed at the center from which winding starts.

FIG. 13 illustrates examples of an electrode assembly of a symmetrical structure, as a comparative example, the electrode assembly including quad cells and a C-type bicell with the C-type bicells disposed at the center from which winding starts. Because of the symmetrical structure, the number of quad cells increases by two from (a) to (d). Accordingly, the number of electrodes increases by eight. Table 3 shows the number of stacks and the number of electrodes in the electrode assembly of a symmetrical structure according to the comparative example.

TABLE 3

| | | | | |
|---|---|---|---|---|
| Number of stacks (example) | 3 | 5 | 7 | 9 |
| Number of electrodes (example) | 11 | 19 | 27 | 35 |
| Number of stacks converted to traditional electrode assembly | 3.67(*) | 6.33(*) | 9.00 | 11.67(*) |

It is found that the present disclosure may also take fine control of the number of electrodes due to having an asymmetrical structure as described above, compared to an electrode assembly of a symmetrical structure.

When (a) through (e) in the present disclosure such as FIG. 12 are converted to the number of stacks of the traditional stack-folding type electrode assembly, the results are 3.67, 5.00, 6.33, 7.67, and 9.00 as shown in Table 2. As marked with an asterisk (*), 3.67, 6.33, and 7.67 are the number of stacks impossible to realize by the stack-folding type electrode assembly (FIGS. 1 and 2) according to the related art only composed of bicells, and 7.67 is the number of stacks impossible to realize by the comparative example of a symmetrical structure. Like this, according to the present disclosure, the degree of freedom of cell design increases.

As noted hereinabove, according to the present disclosure, because it can be designed to increase the number of electrodes by four, fine control of the number of electrodes is enabled as opposed to having to increase the number of electrodes by six or eight, and the number of stacks that could not be realized by a conventional method may be realized, so the degree of freedom of design is high. There are benefits not only in that the number of stacks impossible to realize by the traditional stack-folding type electrode assembly can be realized, but also in that the actual number of stacks is lower although the number of electrodes is the same, leading to the reduced number of lamination and folding (In Table 2, when the actual number of stacks is 4 or 7, the number of stacks converted to the traditional structure is 5 or 9, which is higher than the actual number of stacks). Accordingly, a folding dimensional allowance and a defect ratio may reduce, and the lamination and folding process time may reduce. Furthermore, as unit cells constituting an electrode assembly, one C-type bicell is present and the others are all quad cells, so the cell fabrication efficiency is higher than that of a manufacturing method considering the cell type change like a related art.

Accordingly, it should not be overlooked that the present disclosure is characterized by the increased degree of freedom of cell design and the reduced number of folding through quad cell-bicell combinations, more than merely constructing an electrode assembly by quad cell-bicell combinations.

Figure 14:
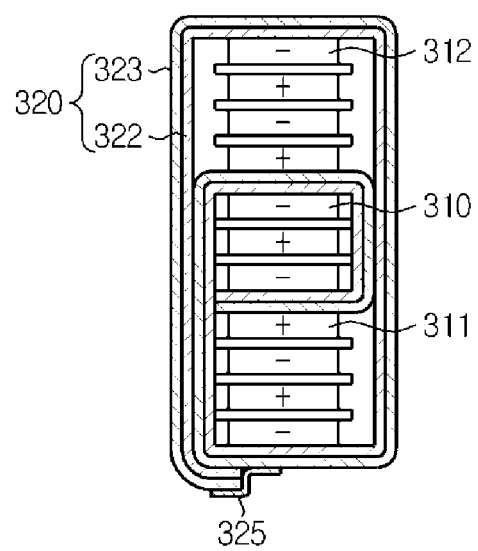
FIG. 14 is a diagram illustrating a stack-folding type symmetrical electrode assembly structure according to another embodiment of the present disclosure.

FIG. 14 is a diagram illustrating a stack-folding type symmetrical electrode assembly structure according to another embodiment of the present disclosure.

Referring to FIG. 14, the stack-folding type symmetrical electrode assembly has a plurality of unit cells 310, 311, and 312 stacked on one another with a folding separator sheet 320 interposed between each stacked unit cell. The folding separator sheet 320 has a unit length sufficient to surround the unit cells 310, 311, and 312, and is interposed between the stacked unit cells 310, 311, and 312 in a structure that is folded inwards each unit length to continuously surround each of the unit cells unit length to continuously surround each of the unit cells 310, 311, and 312 starting from the central unit cell 310 to the outermost unit cell 312. Also, the folding separator sheet 320 is finished by heat welding or attaching, for example, an adhesive tape 325 at an end thereof.

Among the unit cells, the C-type bicell 310 is disposed at the center or a winding start point, and the other unit cells are all the quad cells 311 and 312. The quad cells 311 and 312 respectively disposed above and below the central C-type bicell 310 have electrodes of a symmetrical structure each other. The negative electrode is disposed at the outermost of the electrode assembly.

Particularly, in the electrode assembly shown in FIG. 14, the folding separator sheet 320 is an asymmetrical separator having different properties on both surfaces. Specifically, the folding separator sheet 320 has a stack structure of a first separator 322 and a second separator 323, and has a structure in which the negative electrodes of the C-type bicell 310 and the quad cells 311 and 312 are disposed on the first separator 322, and the positive electrodes of the C-type bicell 310 and the quad cells 311 and 312 are disposed on the second separator 323. For example, the first separator 322 and the second separator 323 may be membranes having different design structures such as a pore size, a distribution, and a thickness. This design may be changed to optimally suit the positive•negative electrode characteristics. Therefore, according to the present disclosure, the battery performance may be improved by allowing positive•negative electrodes of unit cells to coming into contact with a particular surface of an asymmetrical separator.

Figure 15:
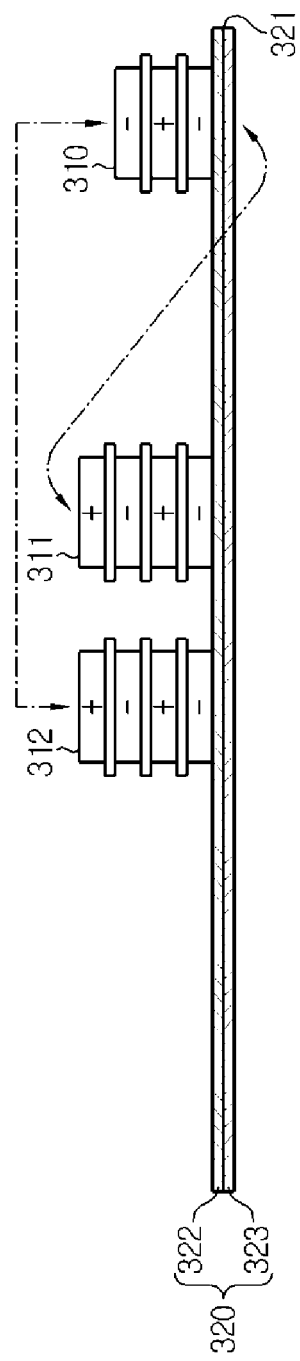
FIG. 15 is a diagram illustrating an arrangement combination of unit cells in a process of manufacturing the stack-folding type symmetrical electrode assembly of FIG. 14.

FIG. 15 is a diagram illustrating an arrangement combination of unit cells in a process of manufacturing the stack-folding type symmetrical electrode assembly of FIG. 14.

Seeing a method of manufacturing a stack-folding type electrode assembly, first, a positive electrode and a negative electrode are stacked with a separator interposed between, and cut in a predetermined size into a plurality of quad cells and a bicell to prepare unit cells 310, 311, and 312. After preparing a folding separator sheet 320 tailored in a long shape, the unit cells 310, 311, and 312 are arranged as shown in FIG. 15. The folding separator sheet 320 has a slightly larger width than the unit cells 310, 311, and 312 such that electrode tabs (not shown) of the unit cells 310, 311, and 312 are exposed, and an extended length sufficient to surround the electrode assembly once after winding, and an outermost end of the folding separator sheet 320 may be fixed by heat welding or attaching a tape. For example, by allowing a heat welder or a hot plate to come into contact with the folding separator sheet 320 to be finished, the folding separator sheet 320 per se may be welded by heat and adhered and fixed, and the folding separator sheet 320 may be also finished by, for example, an adhesive tape 325.

The stack-folding type electrode assembly is manufactured by arranging the unit cells 310, 311, and 312 on the long folding separator sheet 320 and winding in a sequential order starting from one end 321 of the folding separator sheet 320. In this instance, after winding the central unit cell 310 with the folding separator sheet 320 once, the folding separator sheet 320 is folded toward the outside where the adjacent unit cells 311 and 312 are disposed, to stack each unit cell 311 and 312.

Seeing an arrangement combination of the unit cells 310, 311, and 312, the central unit cell 310 or the C-type bicell is disposed at one end 321 of the folding separator sheet 320, and the unit cells 311 and 312 are consecutively arranged at a predetermined interval. The first unit cell, i.e., the central unit cell 310 and the second unit cell 311 are spaced apart at a width interval corresponding to at least one unit cell, so during the winding process, an exterior of the central unit cell 310 is completely covered with the folding separator sheet 320, and then a bottom electrode (negative electrode) of the central unit cell 310 comes into contact with a top electrode (positive electrode) of the second unit cell 311.

The number of unit cells wound on the folding separator sheet 320 may be determined by various factors such as structure of the unit cells including each quad cell and the bicell and a desired capacity of a battery to be finally fabricated. For the convenience of illustration, although FIG. 14 shows three unit cells, the number of unit cells included in the stack-folding type electrode assembly may be fewer or more, and in particular, an electrode assembly for use in HEVs has at least 10 stacks.

The folding separator sheet 320 has a stack structure of the first separator 322 and the second separator 323 and is an asymmetrical separator having different properties on both surfaces. In this embodiment, the negative electrodes of the C-type bicell 310 and the quad cells 311 and 312 are disposed on the first separator 322, followed by lamination and winding, and thus, as opposed to a traditional manufacturing method whereby two types of bicells an A-type bicell and a C-type bicell are prepared and each bicell is wound in an alternating manner, a time loss caused by the cell type exchange (A-type bicell, C-type bicell) may be reduced and the battery fabrication efficiency may be maximized. Without arranging electrodes of unit cells by an alternating arrangement method, fabrication may be accomplished by arranging negative electrodes of all unit cells on a folding separator sheet and winding them, thereby simplifying a manufacturing process and significantly improving the production efficiency.

Figure 16:
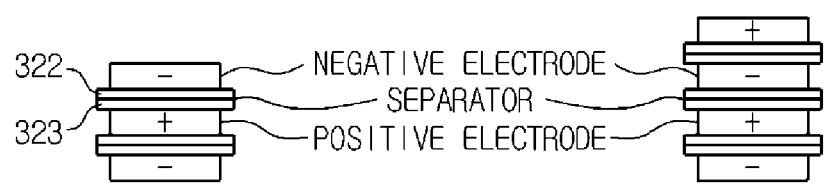
FIG. 16 illustrates another example of a C-type bicell and a quad cell comprising unit cells of a stack-folding type symmetrical electrode assembly according to the present disclosure.

The folding separator sheet 320 may be made from the same material as the separator constituting the unit cell. In this case, the unit cell, i.e., the C-type bicell and the quad cell may have a structure as shown in FIG. 16.

The folding separator sheet or separator may be made from at least one material selected from the group consisting of a microporous polyethylene film, a microporous polypropylene film, or a multilayer film prepared from a combination of these films, and a polymer film for a solid electrolyte of polyvinylidene fluoride, polyethylene oxide, polyacrylonitrile or polyvinylidene fluoride-co-hexafluoropropylene, and may be a folding separator sheet or separator made of a multilayer of two or more layers prepared using the material.

According to the present disclosure, the use of a quad cell having a larger number of electrodes than a bicell may contribute to a lower number of unit assemblies than an ordinary one having the same number of electrodes, and as a consequence, the reduced number of folding. Accordingly, a folding dimensional allowance and a defect ratio may be reduced, and the lamination and folding process time may be reduced.

Also, by the use of an asymmetrical separator, the battery performance may be improved. For example, in this embodiment, the battery performance may be improved by applying, to the first separator 322, a composition and/or thickness for selectively modifying a contact surface between the negative electrode and the separator and applying, to the second separator 323, a composition and/or a thickness for selectively modifying a contact surface between the positive electrode and the separator, so that the positive•negative electrodes selectively come into contact with the surface of the asymmetrical separator.

Figure 1:
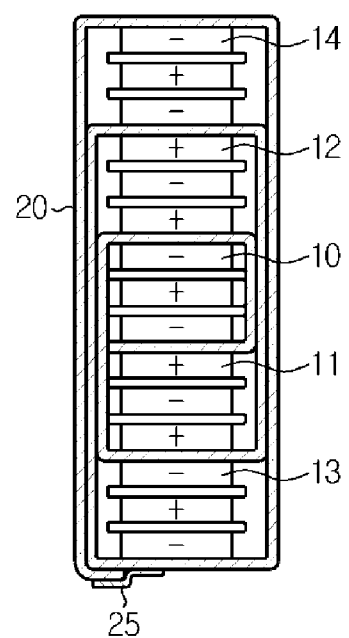
FIG. 1 is a diagram illustrating an exemplary structure of a stack-folding type electrode assembly according to a related art.
Figure 2:
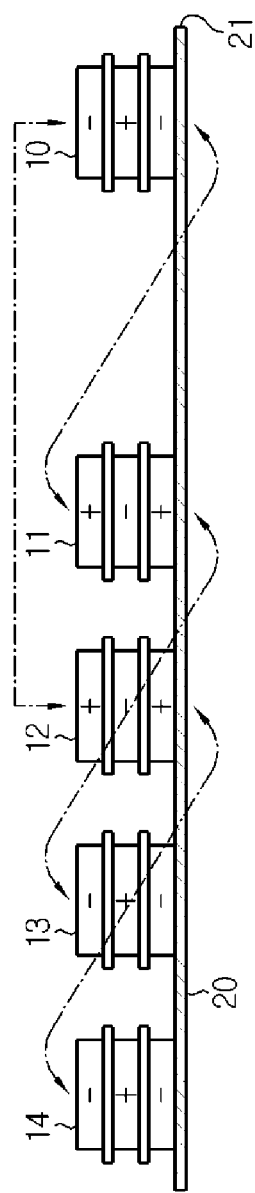
FIG. 2 is a diagram illustrating an example of an arrangement combination of unit cells in a process of manufacturing the stack-folding type electrode assembly of FIG. 1.

In the related art described by referring to FIGS. 1 and 2, because an electrode placed on a folding separator sheet changes in polarity in an alternating manner, this asymmetrical separator structure cannot be applied.

Figure 17:
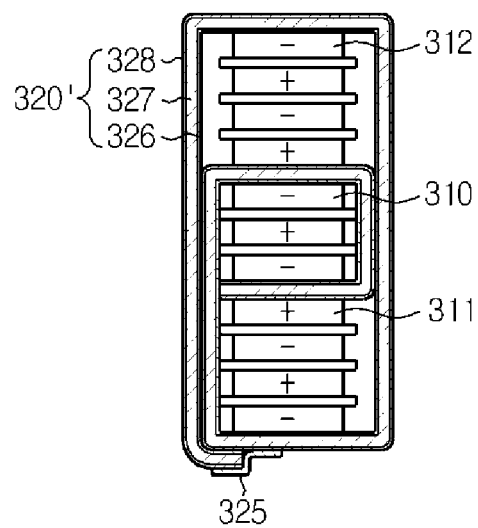
FIG. 17 is a diagram illustrating a stack-folding type symmetrical electrode assembly structure according to another embodiment of the present disclosure.
Figure 18:
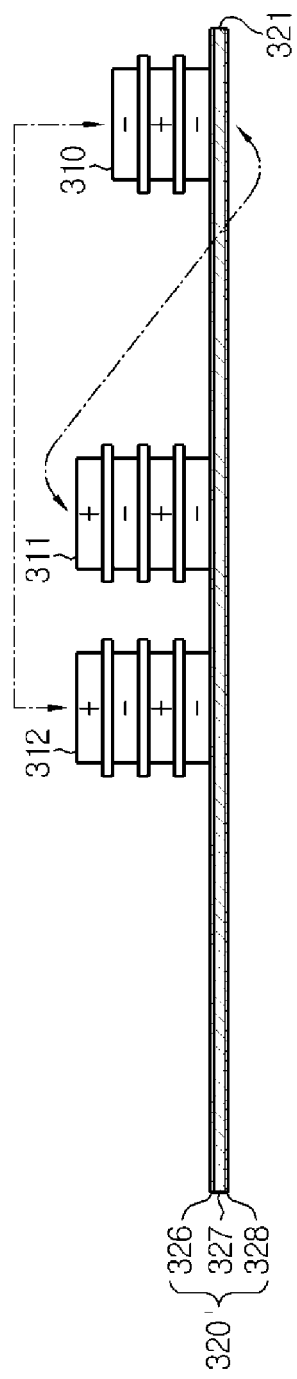
FIG. 18 is a diagram illustrating an arrangement combination of unit cells in a process of manufacturing the stack-folding type symmetrical electrode assembly of FIG. 17.

FIG. 17 is a diagram illustrating a stack-folding type symmetrical electrode assembly structure according to another embodiment of the present disclosure, and FIG. 18 is a diagram illustrating an arrangement combination of unit cells in a process of manufacturing the stack-folding type symmetrical electrode assembly of FIG. 17.

The examples illustrated in FIGS. 17 and 18 alternatively have a folding separator sheet 320' when compared to the examples illustrated in FIGS. 14 and 15.

As shown, the folding separator sheet 320' includes a separator fabric 327, a coating layer 326 formed on one surface of the separator fabric 327, containing an inorganic material for a negative electrode and a binder, and a coating layer 328 formed on the other surface of the separator fabric 327, containing an inorganic material for a positive electrode and a binder. In this instance, the negative electrodes of the C-type bicell 310 and the quad cells 311 and 312 are disposed on the coating layer 326 containing an inorganic material for a negative electrode and a binder, and the positive electrodes of the C-type bicell 310 and the quad cells 311 and 312 are disposed on the coating layer 328 containing an inorganic material for a positive electrode and a binder.

The separator fabric 327 includes a fiber, preferably a fiber selected from polyamide, polyacrylonitrile, polyester [for example: polyethylene terephthalate (PET)] and/or polyolefin [for example: polyethylene (PE) or polypropylene (PP)], a glass fiber or a ceramic fiber. Preferably, the separator fabric 327 may include a polymer fiber having a melting temperature higher than 100° C. and a melting point higher than 310° C. Also, the separator fabric 327 and/or the coating layers 326 and 328 may preferably include $Li_2CO_3$, $Li_3N$ or $LiAlO_3$. The ionic conductivity through the folding separator sheet 320' may be preferably increased thereby. The inorganic material forming the coating layers 326 and 328 may include $SiO_2$, $Al_2O_3$, $ZrO_2$ or SiC.

According to the present disclosure, as opposed to the related art, without arranging electrodes of unit cells by an alternating arrangement method, fabrication may be accomplished by disposing negative electrodes for all unit cells including one C-type bicell and at least two quad cells on the coating layer 326 of the folding separator sheet 320' containing an inorganic material for a negative electrode and a binder and winding them as shown in FIG. 18, thereby simplifying a manufacturing process and significantly improving the production efficiency.

The folding separator sheet 320' is a separator coated with a binder and an inorganic material to improve the secondary battery cell performance, where the negative electrodes of the unit cells are always disposed on the coating layer 326 containing an inorganic material for a negative electrode and a binder, and the positive electrodes of the unit cells are always disposed on the coating layer 328 containing an inorganic material for a positive electrode and a binder, thereby maximizing the asymmetrical separator effects.

As described hereinabove, the stack-folding type symmetrical electrode assembly according to the present disclosure includes, as unit cells, at least two quad cells of a positive electrode/separator/negative electrode/separator/positive electrode/separator/negative electrode structure and one C-type bicell of a negative electrode/separator/positive electrode/separator/negative electrode structure at the center or a winding start point. As the total number of unit assemblies reduces for the same number of electrodes, the number of lamination may reduce, and with the decreasing number of unit assemblies, the number of folding reduces and the degree of freedom of design increases.

Hereinafter, in the case of a stack-folding type symmetrical electrode assembly, an effect of the present disclosure for an increase in the degree of freedom of design and cell design steps are described in further detail.

FIG. 19 illustrates possible examples where the number of stacks is three or more in a symmetrical electrode assembly according to the present disclosure. From (a) to (d), the number of quad cells increases by two. It comes from a result of cell design with the increasing number of quad cells by two, as a result, with the increasing number of electrodes by eight, on the basis of an electrode assembly including two quad cells and one C-type bicell as shown in (a). Table 4 shows the number of stacks and the number of electrodes in the electrode assembly according to the present disclosure.

TABLE 4

| | | | | |
|---|---|---|---|---|
| Number of stacks (example) | 3 | 5 | 7 | 9 |
| Number of electrodes (example) | 11 | 19 | 27 | 35 |
| Number of stacks converted to traditional electrode assembly | 3.67(*) | 6.33(*) | 9.00 | 11.67(*) |

When (a) through (d) in the present disclosure are converted to the number of stacks of the traditional stack-folding type electrode assembly, the results are 3.67, 6.33, 9.00, and 11.67 as shown in Table 4. As marked with an asterisk (*), 3.67, 6.33, and 11.67 are the number of stacks impossible to realize by the stack-folding type electrode assembly (FIGS. 1 and 2) according to the related art only composed of bicells. Like this, according to the present disclosure, the degree of freedom of cell design increases.

As noted hereinabove, there are benefits: as the number of stacks impossible to realize by the conventional method can be realized according to the present disclosure, the degree of freedom of design is high, and the actual number of stacks is lower although the number of electrodes is the same, and as a result, the number of laminations and folding is reduced (In Table 4, when the actual number of stacks is 7, the number of stacks converted to the traditional structure is 9, which is higher than the actual number of stacks). Accordingly, a folding dimensional allowance and a defect ratio may reduce, and the lamination and folding process time may reduce. Furthermore, as unit cells constituting an electrode assembly, one C-type bicell is present and the others are all quad cells, so the cell fabrication efficiency is higher than that of a manufacturing method considering the cell type change like a related art. Also, the battery characteristics may be further improved by applying the asymmetrical separator.

While the preferred embodiments of the present disclosure have been hereinabove illustrated and described, the present disclosure is not limited to the above mentioned particular preferred embodiments, and it should be understood that various changes and modifications may be made by an ordinary person skilled in the art without departing from the doctrine of the disclosure claimed in the appended claims and such changes and modifications fall within the scope of the claims.

What is claimed is:

1. An electrode assembly comprising a plurality of stack type unit cells which is stacked on one another with a continuous folding separator sheet interposed between each of the stacked unit cells,
    wherein the unit cells comprise a combination of at least two quad cells of a positive electrode/separator/negative electrode/separator/positive electrode/separator/negative electrode structure, and one bicell of a negative electrode/separator/positive electrode/separator/negative electrode structure, and
    unit cells, disposed above and below a central part or a winding start point, have an asymmetrical structure each other with the quad cell disposed at the central part, or unit cells, disposed above and below a central part or a winding start point, have a symmetrical structure each other with the bicell disposed at the central part.

2. The electrode assembly according to claim 1, wherein the electrode assembly has a symmetrical structure of the unit cells disposed above and below the central part with the bicell disposed at the central part or a winding start point, and the quad cells respectively disposed above and below the central bicell have an electrode direction which is symmetrical to each other.

3. The electrode assembly according to claim 1, wherein the negative electrode is disposed at an outermost of the electrode assembly.

4. The electrode assembly according to claim 1, wherein the folding separator sheet has a unit length sufficient to surround the unit cells, and is folded inwards each unit length to continuously surround the unit cells starting from a central unit cell to an outermost unit cell.

5. The electrode assembly according to claim 1, wherein the folding separator sheet is an asymmetrical separator having different properties on both surfaces.

6. The electrode assembly according to claim 5, wherein the folding separator sheet comprises:

a separator fabric;
a coating layer formed on one surface of the separator fabric, the coating layer containing an inorganic material for a negative electrode and a binder; and
a coating layer formed on the other surface of the separator fabric, the coating layer containing an inorganic material for a positive electrode and a binder, and
the negative electrodes of the bicell and the quad cells are disposed on the coating layer containing an inorganic material for a negative electrode and a binder, and the positive electrodes of the bicell and the quad cells are disposed on the coating layer containing an inorganic material for a positive electrode and a binder.

7. The electrode assembly according to claim 5, wherein the folding separator sheet has a stack structure of a first separator and a second separator, and the negative electrodes of the bicell and the quad cells are disposed on any one of the first separator and the second separator, and the positive electrodes of the bicell and the quad cells are disposed on the other.

8. A secondary battery comprising an electrode assembly according to claim 1.

9. A method of manufacturing an electrode assembly defined in claim 1, the method comprising:

disposing a central unit cell at one end of a folding separator sheet, and continuously disposing unit cells at a predetermined interval; and
winding the central unit cell with the folding separator sheet once, and folding the folding separator sheet toward an outside where the adjacent unit cell is disposed, to stack the unit cells.

10. The method of manufacturing an electrode assembly according to claim 9, wherein a negative electrode is disposed at an outermost of the electrode assembly.

11. The method of manufacturing an electrode assembly according to claim 9, wherein negative electrodes of the unit cells are disposed on the folding separator sheet.

12. The method of manufacturing an electrode assembly according to claim 9, wherein the folding separator sheet is an asymmetrical separator having different properties on both surfaces.

13. The method of manufacturing an electrode assembly according to claim 12, wherein the folding separator sheet comprises:

a separator fabric;
a coating layer formed on one surface of the separator fabric, the coating layer containing an inorganic material for a negative electrode and a binder; and
a coating layer formed on the other surface of the separator fabric, the coating layer containing an inorganic material for a positive electrode and a binder, and
winding is performed with the negative electrodes of the unit cells disposed on the coating layer containing an inorganic material for a negative electrode and a binder.

14. The method of manufacturing an electrode assembly according to claim 12, wherein the folding separator sheet has a stack structure of a first separator and a second separator, and winding is performed with the negative electrodes of the unit cells disposed on any one of the first separator and the second separator.

15. A method of manufacturing an electrode assembly, the electrode assembly comprising a plurality of stack type unit cells which is stacked on one another with a continuous folding separator sheet interposed between each of the stacked unit cells, the unit cells comprising a combination of at least two quad cells of a positive electrode/separator/negative electrode/separator/positive electrode/separator/negative electrode structure, and one C type bicell of a negative electrode/separator/positive electrode/separator/negative electrode structure, the electrode assembly having an asymmetrical structure of the unit cells disposed above and below a central part with the quad cell disposed at the central part or a winding start point, the method comprising:
a cell design step of increasing a number of quad cells by one to increase a number of electrodes by four, on the basis of an electrode assembly comprising two quad cells and one bicell.

16. The method of manufacturing an electrode assembly according to claim 15, wherein the bicell is inserted at an outermost of the electrode assembly, immediately above or below a center where the winding starts, or in the middle of the stack.

* * * * *